2,824,911
Patented Feb. 25, 1958

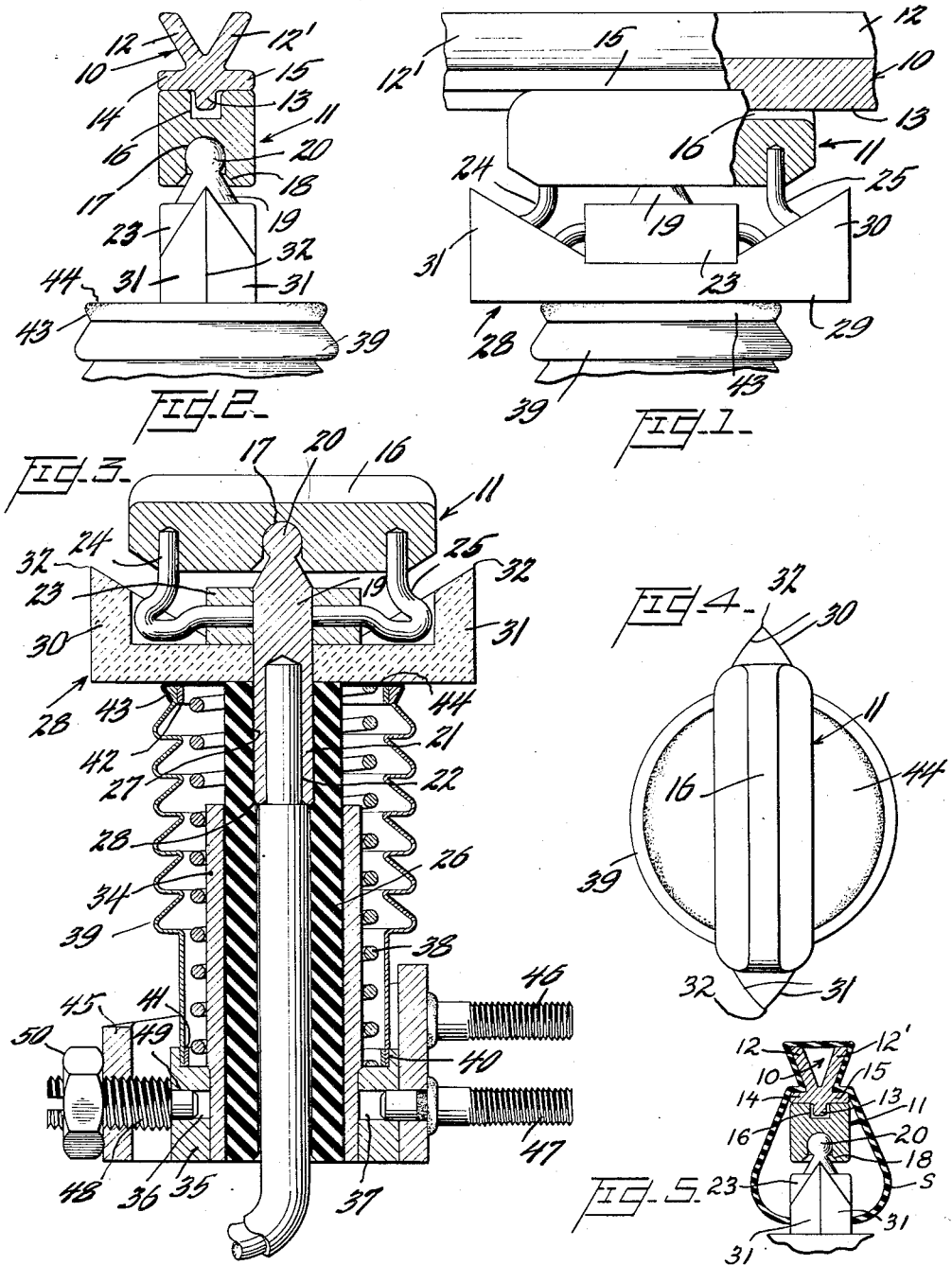

2,824,911
COLLECTOR SHOE AND CONDUCTOR BUS BAR

Ashton B. Taylor, Pittsburgh, Pa.

Application December 3, 1953, Serial No. 395,950

2 Claims. (Cl. 191—25)

This invention relates to an electrical trolley system and is especially designed for electrifying conveying systems where inclines as well as turns of varying radii are encountered, although, of course, it may be used for any purpose for which it is suitable.

It has been found to be particularly useful in connection with electrical tramways, monorails, cranes and other types of similar equipment where it is essential to maintain, at all times, the maximum area of contact between the collector shoe and the conductor bus bar in order to insure full flow of power through the collector shoe and to the equipment with which the system is being used.

An object of the present invention, therefore, is to provide an electrical bus bar and a collector shoe for cooperation therewith which will at all times insure full contact between the two even where the bus bar is inclined from the horizontal or is of curved construction while at the same time compensating for warpage of the conductor bus bar either vertically or horizontally.

Another object is to provide a shaped conductor bus and a collector shoe mating therewith, which will prevent any possibility of the shoe slipping off of the bus bar regardless of the irregularities in the bus bar whether vertical, horizontal or a combination of both.

A further object is to provide a collector shoe mounting which will permit universal movement of the shoe while at the same time yieldingly urging it into contact with the conductor bus so that the shoe maintains its full contact even though the shoe support may move transversely to one side or the other of the collector bus.

Still another object is to provide a spreader which is carried by the shoe support which not only acts to separate the insulated shield carried by the bus bar to permit the shoe to travel along the conductor bus, but at the same time houses the shunt wires which connect the shoe to its power lead and thereby prevent exposure of the shunt wires which otherwise may be damaged and which may be the source of danger to anyone coming into contact therewith.

A still further object is to so shield the movable parts of the collector shoe mounting that dirt, dust and other injurious factors are excluded thereby insuring satisfactory operation even under the most adverse operating conditions.

Other objects and advantages will be apparent as the description proceeds, it being understood that the present embodiment represents only the preferred form of the invention and that changes and modifications may be resorted to, so long as they fall within the spirit and scope of the appended claims.

Referring now to the accompanying drawings which form a part hereof,

Fig. 1 is a fragmentary side elevation of the conductor bus and collector shoe of my invention, Fig. 2 is a transverse sectional view through the bus bar and shoe, Fig. 3 is a vertical sectional view of the collector shoe and its mounting taken at right angles to Fig. 1, Fig. 4 is a top plan view of Fig. 3, and Figure 5 is a fragmentary view similar to Figure 2 but showing the insulating shield.

In the drawing, an electrical conductor bus bar denoted generally at 10 is shown and a collector shoe 11 engages the bus bar for sliding movement therealong.

The bus bar 10 is shaped as shown in section in Fig. 2 and comprises the downwardly converging arms 12 and 12' forming a V and having a rib 13 projecting downwardly from the junction of the arms 12 and 12'.

Extending laterally from the arms 12 and 12' on opposite sides of the bus bar are wings 14 and 15 against which the collector shoe rides, it being noted that the rib 13 projects below the lower faces of the wings 14 and 15 for a purpose which will be later described.

The collector shoe 11 is likewise shaped as shown in section in Fig. 2 and comprises an elongated metallic block of good conducting material having a groove 16 extending longitudinally thereof at its upper surface and having a spherical socket 17 in its lower face provided with flaring walls 18 at the entrance to the socket to permit the shoe to partake of universal rocking movements on its support which will be later described.

As shown in Fig. 2 the rib 13 on the conductor bus projects downwardly into the groove 16 in the shoe, and since the groove is wider than the width of the rib 13, it will be obvious that the shoe may move transversely of the bus bar and that even though the bus bar is curved, the shoe will ride on the wings 14 and 15 around such curves and maintain full contact with the bus bar. The relationship of the rib 13 to the groove 16 is such, however, that the shoe can never move transversely of the bus bar to such an extent that it will slip off of the edges of the wings 14 and 15 and thereby interrupt the proper flow of power.

This same relationship between the rib 13 and groove 16 permits relative horizontal movement between the bus bar and shoe due to irregularities which invariably occur in the manufacture of either the bus bar or shoe or both.

Since the shoe 11 slidably engages the bus bar 10 considerable friction is generated, and while any good conducting material may be used in making the shoe, such as copper, it has been found that friction and wear can be reduced by forming the shoe of copper, graphite, and a suitable binder material compacted to form a dense, relatively non-porous material having long life and which may be produced by extruding the mass through dies which impart thereto the desired configuration. Similarly, the bus bar may be formed of extruded metal of a similar character, although both the bus bar and shoe may be formed in any suitable manner.

As heretofore stated, the shoe 11 is provided with a spherical socket 17. The shoe is supported by a metallic stud 19 having a spherical upper end 20 fitting within the socket 17 and being tubular at its other end as at 21 to receive the lead conductor 22 as shown in Fig. 3.

Surrounding the stud 19 and secured thereto is a metallic terminal block 23. This block and the shoe are connected by means of flexible shunt wires 24 and 25 so that current collected by the shoe will pass through the shunt wires, terminal block, and mounting stud to the lead conductor 22.

By means of the foregoing structure it will be seen that the shoe is free to partake of universal movement relative to the stud 19, while maintaining contact with the bus bar.

The stud 19 is press fitted into the upper end of a tubular plunger 26, and in order to prevent relative turning movement between the stud and plunger, the stud is provided with a knurled outer surface 27, and the stud is prevented from moving downwardly relative to the plunger by means of a shoulder 28, formed by a reduction in bore of the tubular plunger 26.

It is obvious, of course, that the plunger must be made of insulating material, and since such material inherently is of a yieldable character, the stud 19 is firmly gripped as it is forced into the bore of the plunger.

Disposed below the terminal block 23 and clamped between said block and the upper end of the plunger 26, is a spreader 28 which serves the dual function of protecting the shunt wires 24 and 25 from damage and also to spread or separate the walls of a shield member S which encloses the collector shoe and bus bar as shown in my prior application Serial No. 380,645, filed September 17, 1953.

To this end the spreader 28 consists of a base 29 and upstanding walls 30, 31 at opposite ends thereof, the walls extending toward the stud 19 along the sides of the base to form a trough for the reception of the shunt wires 24 and 25, and while the walls are shown as converging downwardly toward the base, this is not essential.

The walls 30 and 31, as clearly shown in Figs. 2 and 4, merge into vertically extending points 32 at opposite ends of the spreader so that as the shoe travels along the conductor bus the pointed ends wedge the walls of the shield S apart to permit travel of the shoe along the bus bar.

In trolley systems such as here contemplated, it is usual that irregularities will be encountered in the manufacture of the bus bar or collector shoe and that these irregularities may take the form of undulations which are either vertical or horizontal or both, but since it is essential that full contact be present between the bus bar and shoe under any and all conditions, the present invention contemplates means for resiliently urging these members into contact so that the desired object is obtained.

Plunger 26 is received in a steel tube 34, the plunger being of such size that it may freely slide within the tube. The steel tube 34 is rigidly fixed to and supported by a metal bottom collar 35, which surrounds the tube, and the collar is provided with diametrically opposed openings or recesses 36 and 37.

A compression spring 38 is interposed between the collar 35 and the spreader 28 and due to its expansion urges the plunger, spreader, stud, terminal block, and shoe, toward the bus bar, thereby maintaining resilient contact between the shoe and bus bar at all times.

In order to exclude dust, dirt, or other material from interfering with the sliding action of the plunger 26 and to protect the spring, there is provided a flexible, collapsible, and expansible bellows 39 which surrounds the spring 38.

The lower end of the bellows is secured within a recess 40 in the bottom block 35 by means of a split ring 41 and is secured at its upper end by means of a split ring 42 which clamps the upper end against an annular flange 43 formed on a disc 44 abutting the lower face of the spreader 28. By this construction the contraction and expansion of the spring is permitted but the enclosed parts are fully protected.

It frequently happens in installation of trolley systems that the bus bar is not at all times in alignment with the shoe support whether it be due to faulty construction or warpage of the parts, and in order to take care of such conditions the shoe support must be capable of moving transversely of the bus bar while the shoe is in contact with the bus bar.

The present invention is designed to permit the shoe support to move to one side or the other of the bus bar as the shoe moves along the bus bar and is accomplished by pivotally supporting the bottom collar to permit swinging movement of the steel tube 34, the plunger 26 and its associated parts while the universal joint between the stud 19 and shoe 11 permits the shoe to ride on the bus bar without tilting which would break contact between the shoe and one or other of the wings 14, 15 on the bus bar.

As stated, the bottom collar is provided with openings 36 and 37. A U-shaped mounting bracket 45 encircles the bottom collar and is supported by threaded rods 46 and 47 secured thereto and which may be connected to a towing bar or other suitable support. The rod 47 projects through the bottom collar 35 and into the opening 37 in the bottom collar and forms a trunnion about which the collar rotates. At the opposite side of the bracket a bolt 48 is threaded through an opening in the bracket and has a reduced end 49 fitting into the opening 36 in the bottom collar where it forms a trunnion, which with the trunnion formed by the bolt 47 permits the collar 35 to pivot within the bracket 45 and thereby prevent tilting of the collector shoe away from the bus bar. The bolt 48 is held in proper position by means of a locknut 50, and by removing this nut and turning the bolt 48 to withdraw the trunnion 49 from the opening 36, it will be apparent that the bottom collar and its supported structures may be removed for replacement or repair.

From the foregoing, it will be seen that in use, the collector shoe must be mounted on a bracket or other support carried by the apparatus that uses the current. The shoe must travel in a path directly under and in contact with the bus bar. Since it can be understood that the relative paths of the apparatus and the conductor bus would not always be perfectly parallel and in alignment, some provision is necesssary to absorb vertical variations and also sideways motion of the apparatus.

The vertical play is readily compensated by the spring loaded plunger, and horizontal movement of the apparatus transversely of the bus bar which would tend to throw the shoe off of the track is taken care of by the ball and socket joint between the stud and shoe as well as the pivotal mounting of the shoe support in its bracket. The only force being transmitted to the shoe is one tending to keep the shoe pressed against the bus bar. The groove in the shoe mating with the downwardly projecting rib on the bus bar will prevent the shoe from slipping off of the track under extreme sideways thrusts, and in view of the dimensions of said rib and groove the bus bar can be curved in a horizontal plane with no appreciable loss of contact surface between the shoe and bus bar.

I claim:

1. An electrical trolley system comprising a conductor bus bar element, an insulating shield surrounding said bus bar and having depending abutting wings extending below said bar, a collector shoe comprising an elongated block of conducting material adapted to engage and slide along said conductor bus bar, a support for said shoe including a universal joint between the support and shoe, flexible shunt wires connecting said shoe and support and a spreader on said support beneath said wires for spreading apart the wings of an insulating shield surrounding said bus bar, said spreader having pockets therein housing said wires to prevent contact with and damage to said wires.

2. A system as recited in claim 1 in which the spreader is provided with upstanding walls at opposite sides thereof and at opposite ends to form said pockets, said walls merging into oppositely facing points at the ends of the spreader whereby the spreader houses said shunt wires and spreads an insulating shield surrounding said bus bar as the shoe travels along said bus bar.

References Cited in the file of this patent
UNITED STATES PATENTS

| Number | Name | Date |
|---|---|---|
| 561,830 | Stanley | June 9, 1896 |
| 734,920 | Maxwell | July 28, 1903 |
| 915,152 | Barr | Mar. 16, 1909 |
| 1,048,732 | Piotrowski | Dec. 31, 1912 |
| 1,154,293 | Cross | Sept. 21, 1915 |
| 1,565,487 | Moore | Dec. 15, 1925 |
| 1,777,955 | Blackhall | Oct. 7, 1930 |
| 1,918,854 | Mead | July 18, 1933 |
| 1,925,741 | Alexander | Sept. 5, 1933 |
| 2,155,242 | Ryan | Apr. 18, 1939 |
| 2,668,199 | Connell | Feb. 2, 1954 |